Figure 1:
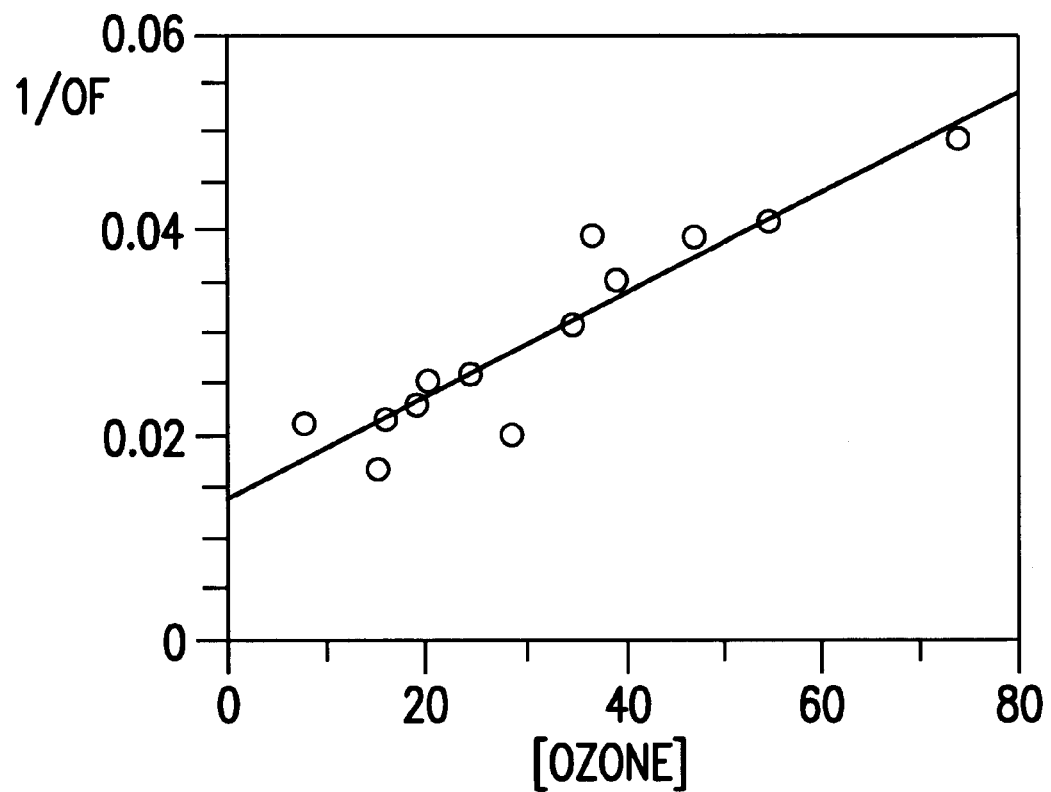
Figure 2:
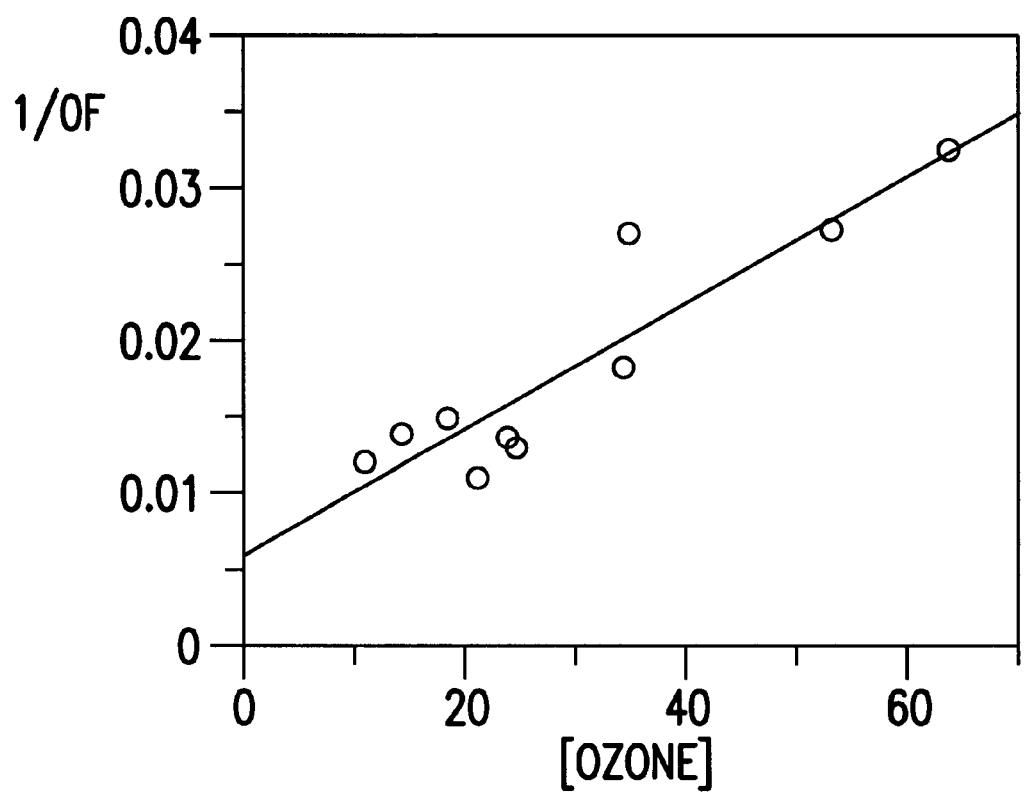
Figure 3:
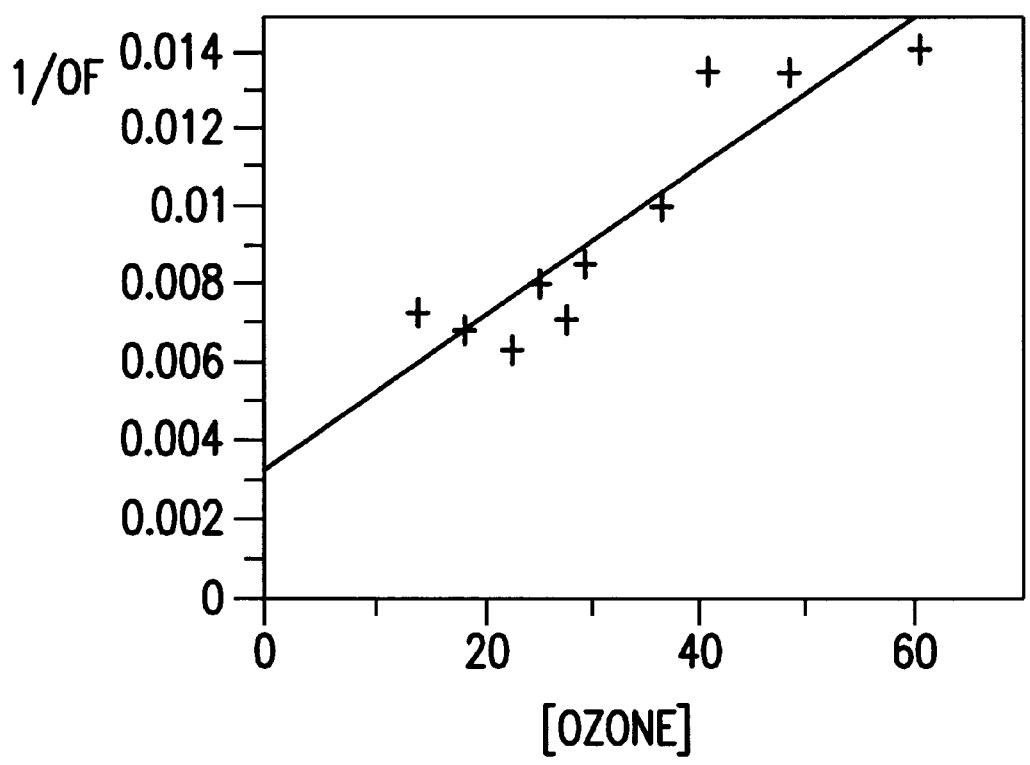
Figure 4:
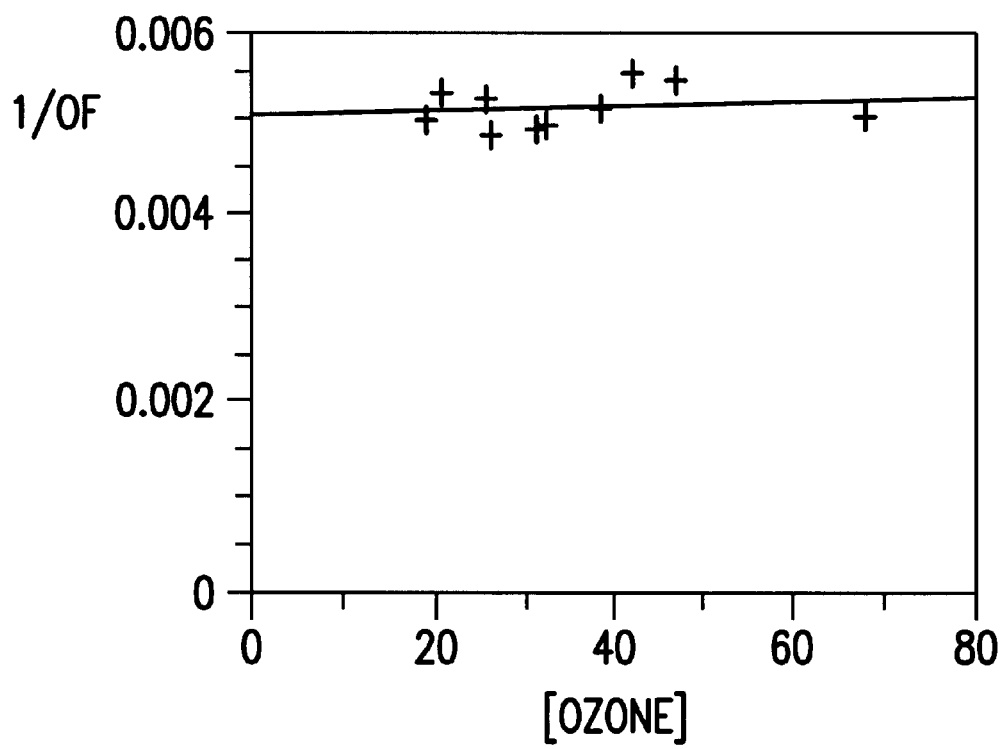

United States Patent
Gugumus

[11] Patent Number: 5,965,641
[45] Date of Patent: Oct. 12, 1999

[54] OZONE-RESISTANT LONG-TERM STABILISERS

[75] Inventor: François Gugumus, Allschwil, Switzerland

[73] Assignee: Ciba Specialty Chemicals Corporation, Tarrytown, N.Y.

[21] Appl. No.: 08/889,988

[22] Filed: Jul. 10, 1997

[30] Foreign Application Priority Data

Jul. 17, 1996 [CH] Switzerland ............... 1787/96
May 14, 1997 [CH] Switzerland ............... 1134/97

[51] Int. Cl.⁶ .......... C08J 5/45; C07D 403/00; C07D 211/00; C07D 211/36
[52] U.S. Cl. .......... 524/86; 544/198; 544/209; 546/184; 546/242
[58] Field of Search .......... 544/198, 209; 546/184, 242; 524/86

[56] References Cited

U.S. PATENT DOCUMENTS

| | | | |
|---|---|---|---|
| 3,640,928 | 2/1972 | Murayama et al. | 260/23 |
| 4,086,204 | 4/1978 | Cassandrini et al. | 260/45.8 |
| 5,665,885 | 9/1997 | Steinmann | 546/242 |

FOREIGN PATENT DOCUMENTS 221487  5/1987  European Pat. Off. .

OTHER PUBLICATIONS

Derwent Abstract 94–211993 for JP–A 6148928.
Derwent Abstract 93–240115 for JP–A 5163398.
Derwent Abstract 91–122991 for JP–A 3064328.
Derwent Abstract 94–313922 for JP–A 6240200.
R.P. Lattimer et al., Ozone Degradation & Antiozonants, G. Scott (Ed.) Atmospheric Oxidation & Antioxidants, vol. 2, Chapter 7, 363.

*Primary Examiner*—John Kight
*Assistant Examiner*—Raymond Covington
*Attorney, Agent, or Firm*—Kevin T. Mansfield; Lurther A. R. Hall

[57] ABSTRACT

A description is given of a process for stabilising an organic polymer against ozone in the ambient air, which comprises adding to the polymer as stabiliser a monomeric sterically hindered piperidine compound, or an oligomeric or polymeric sterically hindered piperidine compound containing one or several triazine units, or a secondary sterically hindered piperidine compound, the piperidine compound containing in any case at least one unit of formula I

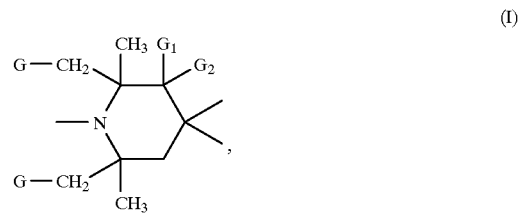

wherein G is hydrogen or methyl, and $G_1$ and $G_2$ are hydrogen, methyl or, taken together, oxygen.

With this process it is possible to make a more accurate prediction of the service time of the polymer and it helps to avoid unnecessarily high dosages of the stabiliser.

9 Claims, 4 Drawing Sheets

OZONE-RESISTANT LONG-TERM STABILISERS

The present invention relates to a process for stabilising organic polymers against ozone in the ambient air, to corresponding compositions as well as to the use of specific sterically hindered amines as ozone stabilisers.

It is known that the action of ozone on rubber can result in crack-formation (R.P. Lattimer et al. in G. Scott (Ed.) Atmospheric Oxidation and Antioxidants, Vol. 2, Chapter 7, 363, Elsevier, Amsterdam).

The stability of organic polymers against the harmful action of light, atmospheric oxygen and heat is usually improved by adding antioxidants and/or light stabilisers to the polymers, typically those of the class of the sterically hindered amines.

However, a frequent problem is that the efficiency of the stabilisation is subject to enormous fluctuations and that therefore the effectivity of the stabilisation and hence the service life of the stabilised polymer can be predicted only unsatifactorily.

It has now been found that the presence of ozone in the ambient air can have a damaging effect on unsaturated as well as on saturated organic polymers.

At the same time it has surprisingly been found that the use of specific sterically hindered amines, described hereinafter, can markedly improve the stabilisation in the presence of ozone. The stability of the polymers so obtained unexpectedly does not depend on the ozone concentration and it is therefore possible to make a much more accurate prediction of the service life of the articles prepared therefrom.

Accordingly, this invention relates to a process for stabilising an organic polymer against ozone in the ambient air, which comprises adding to the polymer as stabiliser a monomeric sterically hindered piperidine compound, or an oligomeric or polymeric sterically hindered piperidine compound containing one or several triazine units, or a secondary sterically hindered amine.

Monomeric sterically hindered piperidine compounds will be understood in this case as being those compounds which have an average molecular weight in the range of 140 to 1000 g/mol, preferably of 150-800 g/mol and which contain at least one radical of formula I

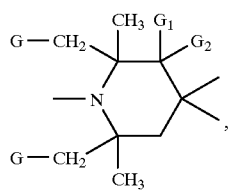

(I)

wherein
G is hydrogen or methyl, and
$G_1$ and $G_2$ are hydrogen, methyl or, taken together, oxygen.

The molecular weight of an oligomeric or polymeric sterically hindered piperidine compound containing one or several triazine units is normally more than 1000 g/mol, preferably more than 1200 g/mol; these compounds contain at least 3, usually several, groups of formula I as well as at least one triazine ring of formula

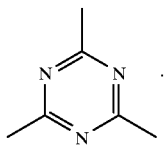

Of the active sterically hindered piperidine compounds, the secondary sterically hindered amines are particularly interesting. These are to be understood as being compounds containing at least one 2,2,6,6-tetramethylpiperidine unit of formula I'

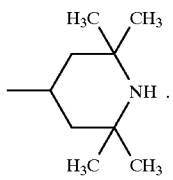

(I')

This invention embraces the use of the cited sterically hindered piperidine compounds, preferably of secondary sterically hindered amines, as ozone stabilisers for organic polymers as well as a correspondingly stabilised organic polymer in contact with ozone-containing air.

According to this invention, organic polymers can be effectively protected against the harmful effects of ozone in the ambient air. Such protection is to be recommended especially when the working properties of the polymer to be protected should be retained for a longer period of time. Accordingly, the sterically hindered piperidine compounds cited above are excellently suitable for the long-term stabilisation of organic polymers and of the articles prepared therefrom.

The ozone content of the air is subject to considerable fluctuation. The ozone content relevant with respect to the organic polymer is usually determined via the concentration averaged by the service life (average concentration).

A higher ozone content normally results in greater damage to the polymer. As the novel ozone stabilisers are capable of preventing damage to the polymer, their use is particularly advantageous whenever higher ozone concentrations are present in the ambient air in the course of the service life of the polymer. Is has been found that organic polymers not stabilised according to this invention are markedly damaged already below the average concentration of 15 $\mu$g of ozone per cubic metre of air. It is particularly expedient to stabilise the organic polymers against damage by ozone in accordance with this invention when the ozone concentration averaged by the service life is more than 10 $\mu$g/m$^3$, in particular more than 30 $\mu$g/M$^3$, typically at an average concentration of more than 20 $\mu$g/m$^3$, preferably of more than 40 $\mu$g/M$^3$, particularly preferably of more than 50 $\mu$g/m$^3$. Of particular interest is the use of those classes of piperidines, described under (a') to (f'), which carry at least one group of formula 1, as described above:

(a') compounds of formula Ia

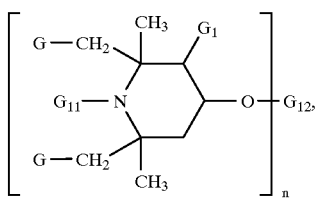

(Ia)

wherein n is a number from 1 to 4,

G$_1$ and G$_1$ are each independently of the other hydrogen or methyl,

G$_{11}$ is hydrogen, O', hydroxy, NO, —CH$_2$CN, C$_1$–C$_{18}$alkyl, C$_3$–C$_8$alkenyl, C$_3$–C$_8$alkyyl, C$_7$–C$_{12}$— aralkyl, C$_1$–C$_{18}$alkoxy, C$_5$–C$_8$cycloalkoxy, C$_7$–C$_9$phenylalkoxy, C$_1$–C$_8$alkanoyl, C$_3$–C$_5$alkenoyl, benzyloxy, glycidyl or a group —CH$_2$CH(OH)—Z, G$_{11}$ preferably being hydrogen, C$_1$–C$_4$alkyl, allyl, benzyl, acetyl or acryloyl, Z is hydrogen, methyl or phenyl, and, if n=1, G$_{12}$ is hydrogen; C$_1$–C$_{18}$alkyl, which may be interrupted by one or several oxygen atoms; cyanoethyl; benzyl; glycidyl; a monovalent radical of an aliphatic, cycloaliphatic, araliphatic, unsaturated or aromatic carboxylic acid, carbamic acid or phosphorus-containing acid, or a monovalent silyl radical, preferably a radical of an aliphatic carboxylic acid having 2 to 18 carbon atoms, of a cycloaliphatic carboxylic acid having 7 to 15 carbon atoms, of an α,β-unsaturated carboxylic acid having 3 to 5 carbon atoms or of an aromatic carboxylic acid having 7 to 15 carbon atoms, where the carboxylic acid can be substituted by 1 to 3 —COOZ$_{12}$ in the aliphatic, cycloaliphatic or aromatic moiety, respectively, Z$_{12}$ is hydrogen, C$_1$–C$_{20}$alkyl, C$_3$–C$_{12}$alkenyl, C$_5$–C$_7$cycloalkyl, phenyl or benzyl, and, if n=2, G$_{12}$ is C$_2$–C$_{12}$alkylene, C$_4$–C$_{12}$alkenylene, xylylene, a divalent radical of an aliphatic, cycloaliphatic, araliphatic or aromatic dicarboxylic acid, dicarbamic acid or phosphorus-containing acid, or a divalent silyl racidal, preferably a radical of an aliphatic dicarboxylic acid having 2 to 36 carboxylic atoms, of a cycloaliphatic or aromatic dicarboxylic acid having 8 to 14 carbon atoms, or of an aliphatic, cycloaliphatic or aromatic dicarbamic acid having 8 to 14 carbon atoms, and wherein the dicarboxylic acid can be substituted by 1 or 2 groups —COOZ$_{12}$ in the aliphatic, cycloaliphatic or aromatic moiety, respecitively, and, if n=3, G$_{12}$ is a trivalent radical of an aliphatic, cycloaliphatic or aromatic tricarboxylic acid, which radical can be substituted in the aliphatic, cycloaliphatic or aromatic moiety by —COOZ$_{12}$, of an aromatic tricarbamic acid or of a phosphorus-containing acid, or a trivalent silyl radical, and, if n=4, G$_{12}$ is a tetravalent radical of an aliphatic, cycloaliphatic or aromatic tetracarboxylic acid.

The cited carbonates embrace the corresponding radicals of formula (—CO)$_n$R, the meaning of n being indicated above and the meaning of R following from the indicated definition.

Any substituents defined as C$_1$–C$_{12}$alkyl are typically methyl, ethyl, n-propyl, n-butyl, sec-butyl, tert-butyl, n-hexyl, n-octyl, 2-ethylhexyl, n-nonyl, n-decyl, n-undecyl or n-dodecyl.

G$_{11}$ or G$_{12}$ defined as C$_1$–C$_{18}$alkyl can be, for example, the above groups and additionally also e.g. n-tridecyl, n-tetradecyl, n-hexadecyl or n-octadecyl.

C$_3$–C$_8$Alkenyl G$_{11}$ defined can be, for example, 1-propenyl, allyl, methallyl, 2-butenyl, 2-pentenyl, 2-hexenyl, 2-octenyl or 4-tert-butyl-2-butenyl.

G$_{11}$ defined as C$_3$–C$_8$alkynyl is preferably propargyl.

C$_7$–C$_{12}$ Aralkyl G$_{11}$ is preferably phenethyl and, most preferably, benzyl.

G$_{11}$ defined as C$_1$–C$_8$alkanoyl is typically formyl, propionyl, butyryl, octanoyl and, preferably, acetyl, and defined as C$_3$–C$_5$alkenoyl it is preferably acryloyl.

G$_{12}$ defined as a monovalent radical of a carboxylic acid is typically the radical of acetic acid, capric acid, stearic acid, acryllic acid, methacryllic acid, benzoic acid or β-(3,5-di-tert-butyl-4-hydroxyphenyl) propionic acid.

G$_{12}$ defined as monovalent silyl radical is typically a radical of formula —(C$_j$H$_{2j}$)—Si(Z')$_2$Z", wherein j is an integer in the range from 2 to 5, and Z' and Z" are each independently of the other C$_1$–C$_4$alkyl or C$_1$–C$_4$alkoxy.

G$_{12}$ defined as a divalent radical of a dicarboxylic acid is typically a radical of malonic acid, succinic acid, glutaric acid, adipic acid, subaric acid, sebacic acid, maleic acid, itaconic acid, phthalic acid, dibutylmalonic acid, dibenzylmalonic acid, butyl(3,5-di-tert-butyl-4-hydroxybenzyl)malonic acid or bicycloheptenedicarboxylic acid.

In the definition of a trivalent radical of a tricarboxylic acid, G$_{12}$ is typically a radical of trimellitic acid, citric acid or nitrilotriacetic acid.

In the definition of a tetravalent radical of a tetracarboxylic acid, G$_{12}$ is typically a tetravalent radical of butane-1,2, 3,4-tetracarboxylic acid or of pyromellitic acid.

In the definition of a divalent radical of a dicarbamic acid, G$_{12}$ is typically a radical of hexamethylenedicarbamic acid or of 2,4-toluylenedicarbamic acid.

Preferred compounds of formula la are those, wherein G is hydrogen, G$_{11}$ is hydrogen or methyl, n is 2, and G$_{12}$ is the diacyl radical of an aliphatic dicarboxylic acid having 4 to 12 carbon atoms.

The following compounds are illustrative examples of polyalkylpiperidine compounds of this class:

1) 4-hydroxy-2,2,6,6-tetramethylpiperidine
2) 1-allyl-4-hydroxy-2,2,6,6-tetramethylpiperidine
3) 1-benzyl-4-hydroxy-2,2,6,6-tetramethylpiperidine
4) 1-(4-tert-butyl-2-butenyl)-4-hydroxy-2,2,6,6-tetramethylpiperidine
5) 4-stearoyloxy-2,2,6,6-tetramethylpiperidine
6) 1-ethyl-4-salicyloyloxy-2,2,6,6-tetramethylpiperidine
7) 4-methacryloyloxy-1,2,2,6,6-pentamethylpiperidine
8) 1,2,2,6,6-pentamethylpiperidin-4-yl-β-(3,5-di-tert-butyl-4-hydroxyphenyl)propionate
9) di(1-benzyl-2,2,6,6-tetramethylpiperidin-4-yl) maleinate
10) di(2,2,6,6-tetramethylpiperidine-4-yl)succinate
11) di(2,2,6,6-tetramethylpiperidin-4-yl)glutarate
12) di(2,2,6,6-tetramethylpiperidin-4-yl)adipate
13) di(2,2,6,6-tetramethylpiperidin-4-yl)sebacate 14) di (1,2,2,6,6-pentamethylpiperidin-4-yl)sebacate 15) di(1,2,3,6-tetramethyl-2,6-diethylpiperidin-4-yl) sebacate 16) di(1-allyl-2,2,6,6-tetramethylpiperidin-4-yl)phthalate 17) 1-hydroxy-4-β-cyanoethyloxy-2,2,6,6-tetramethylpiperidine 18) 1-acetyl-2,2,6,6-tetramethylpiperidin-4-yl-acetate 19) tri(2,2,6,6-tetramethylpiperidin-4-yl) trimellitate 20) 1-acryloyl-4-benzyloxy-2,2,6,6-tetramethylpiperidine 21) di(2,2,6,6-tetramethylpiperidin-4-yl)diethylmalonate 22) di(1,2,2,6,6-pentamethylpiperidin-4-yl) dibutylmalonate 23) the di(1,2,2,6,6-pentamethylpiperidin-4-yl) ester of butyl(3,5-di-tert-butyl-4-hydroxybenzyl)malonic acid 24) di(1-octyloxy-2,2,6,6-tetramethylpiperidin-4-yl) sebacate 25) di(1-cyclohexyloxy-2,2,6,6-tetramethylpiperidin-4-yl)sebacate 26) hexane-1',6'-bis(4-carbamoyloxy-1-n-butyl-2,2,6,6-tetramethylpiperidine)

27) toluene-2',4'-bis(4-carbamoyloxy-1-n-propyl-2,2,6,6-tetramethylpiperidine)

28) dimethyl-bis(2,2,6,6-tetramethylpiperidin-4-oxy)silane 29) phenyl-tis(2,2,6,6-tetramethylpiperidin-4-oxy)silane 30) tris(1-propyi-2,2,6,6-tetramethylpiperidin-4-yl)phosphite 31) tris(1-propyl-2,2,6,6-tetramethylpiperidin-4-yl)phosphate 32) phenyl-[bis(1,2,2,6,6-pentamethylpiperidin-4-yl)] phosphonate 33) 4-hydroxy-1,2,2,6,6-pentamethylpiperidine 34) 4-hydroxy-N-hydroxyethyl-2,2,6,6-tetramethylpiperidine 35) 4-hydroxy-N-(2-hydroxypropyl)-2,2,6,6-tetramethylpiperidine 36) 1-glycidyl-4-hydroxy-2,2,6,6-tetramethylpiperidine (b') compounds of formula Ib

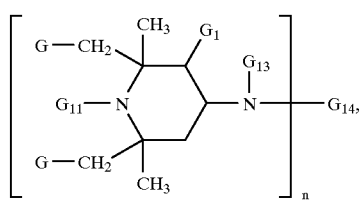

wherein n is 1 or 2,

G, $G_1$ and $G_{11}$ have the meanings cited for (a'), $G_{13}$ is hydrogen, $C_1$–$C_{12}$alkyl, $C_2$–$C_5$hydroxyalkyl, $C_5$–$C_7$cycloalkyl, $C_7$–$C_8$aralkyl, $C_2$–$C_{18}$-alkanoyl, $C_3$-$C_5$alkenoyl, benzoyl or a group of formula

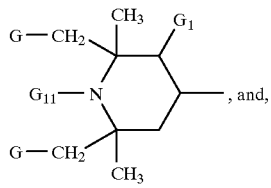

if n=1, $G_{14}$ is hydrogen, $C_1$–$C_{18}$alkyl, $C_3$–$C_8$-alkenyl, $C_5$–$C_7$cycloalkyl; $C_1$–$C_4$alkyl substituted by a hydroxy, cyano, alkoxycarbonyl or carbamide group; glycidyl, a group of formula —$CH_2$—H(OH)—Z or of formula —CONH—Z, wherein Z is hydrogen, methyl or phenyl, and, if n=2, $G_{14}$ is $C_2$–$C_{12}$alkylene, $C_6$–$C_{12}$arylene, xylylene, a —$CH_2$—CH(OH)—$CH_2$ group or a group —$CH_2$—H(OH)—$CH_2$-O-D-O-, wherein D is $C_2$–$C_{10}$alkylene, $C_6$–$C_{15}$arylene, $C_6$–$C_{12}$cycloalkylene, or, with the proviso that $G_{13}$ is not alkanoyl, alkenoyl or benzoyl, $G_{14}$ can also be 1-oxo-$C_2$—$C_{12}$alkylene, a divalent radical of an aliphatic, cycloaliphatic or aromatic dicarboxylic acid or dicarbamic acid, or also the group —CO—, or, if n=1, $G_{13}$ and $G_{14}$ together can be the divalent radical of an aliphatic, cycloaliphatic or aromatic 1,2- or 1,3-dicarboxylic acid.

Any substituents defined as $C_1$–$C_{12}$alkyl or $C_1$–$C_{18}$alkyl have the meaning cited above for (a').

Any substituents defined as $C_5$–$C_7$Cycloalkyl are preferably cyclohexyl.

$C_7$–$C_8$Aralkyl $G_{13}$ is preferably phenylethyl or, most preferably, benzyl. $C_2$–$C_5$Hydroxyalkyl $G_{13}$ is preferably 2-hydroxyethyl or 2-hydroxypropyl.

$G_{13}$ defined as $C_2$–$C_{18}$alkanoyl is typically propionyl, butyryl, octanoyl, dodecanoyl, hexadecanoyl, octadecanoyl and, preferably, acetyl, and defined as $C_3$–$C_5$alkenoyl it is preferably acryloyl.

$G_{14}$ defined as $C_2$–$C_8$alkenyl is typically allyl, methallyl, 2-butenyl, 2-pentenyl, 2-hexenyl or 2-octenyl.

$G_{14}$ defined as $C_1$–$C_4$alkyl which is substituted by a hydroxy, cyano, alkoxycarbonyl or carbamide group can be, for example, 2-hydroxyethyl, 2-hydroxypropyl, 2-cyanoethyl, methoxycarbonylmethyl, 2-ethoxycarbonylethyl, 2-aminocarbonylpropyl or 2-dimethylamino-carbonyl)ethyl.

Any substituents defined as $C_2$–$C_{12}$alkylene are typically ethylene, propylene, 2,2-dimethyl-propylene, tetramethylene, hemethylene, octamethylene, decamethylene or dodecamethylene.

Any substituents defined as $C_6$–$C_{15}$arylene are typically o-, m- or p-phenylene, 1,4-naphthlene or 4,4'-diphenylene.

$C_6$–$C_{12}$ cloalkylene to be mentioned in particular is cyclohexylene.

Preferred compounds of formula 1b are those, wherein n=1 or 2, G is hydrogen, $G_{11}$ is hydrogen or methyl, $G_{13}$ is hydrogen, $C_1$–$C_{12}$alkyl or a group of formula

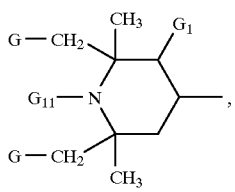

and $G_{14}$, if n=1, is hydrogen or $C_1$–$C_{12}$alkyl and, if n=2, is $C_2$–$C_8$alkylene or 1-oxo-$C_2$–$C_8$-alkylene.

The following compounds are illustrative examples of polyalkylpiperidine compounds of this class:

37) N,N'-bis(2,2,6,6tetramethylpiperidin-4-yl)hexamethylene-1,6-diamine
38) N,N'-bis(2,2,6,6-tetramethylpiperidin-4-yl)hexamethylene-1,6-diacetamide
39) bis(2,2,6,6-tetramethylpiperidin-4-yl)amine
40) 4-benzoylamino-2,2,6,6-tetramethylpiperidine
41) N,N'-bis(2,2,6,6-tetramethylpiperidin-4-yl)-N,N'-dibutyladipamide
42) N,N'-bis(2,2,6,6-tetramethylpiperidin-4-yl)-N,N'-dicyclohexyl-2-hydroxypropylene-1,3-diamine
43) N,N'-bis(2,2,6,6-tetramethylpiperidin-4-yl)-p-xylylenediamine
44) N,N'-bis(2,2,6,6-tetramethylpiperidin-4-yl)succindiamide
45) the di(2,2,6,6-tetramethylpiperidin-4-yl) ester of N-(2,2,6,6-tetramethylpiperidine-4-yl)-β-aminodiproponic acid
46) the compound of formula

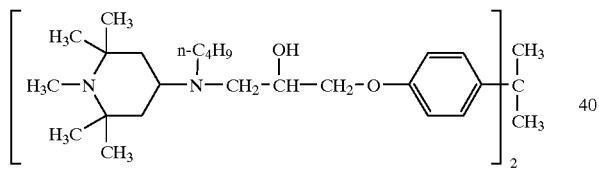

47) 4-(bis-2-hydroxyethylamino)-1,2,2,6,6-pentamethylpiperidine
48) 4-(3-methyl-4-hydroxy-5-tert-butyl-benzoic acid amido)-2,2,6,6-tetramethylpiperidine
49) 4-methacrylamido-1,2,2,6,6-pentamethylpiperidine (c') compounds of formula Ic

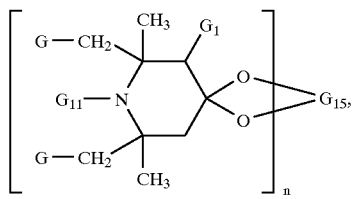

wherein n is 1 or 2, G, $G_1$ and $G_{11}$ have the meaning cited for (a'), and, if n=1, $G_{15}$ is $C_2$–$C_8$alkylene or $C_2$–$C_8$hydroxyalkylene or $C_4$–$C_{22}$acyloxyalkylene, and, if n=2, $G_{15}$ is the (—$CH_2$)$_2$C($CH_2$—)$_2$ group.

In the definition of $C_2$–$C_8$alkylene or $C_2$–$C_8$hydroxyalkylene, $G_{15}$ is typically ethylene, 1-methylethylene, propylene, 2-ethylpropylene or 2-ethyl-2-hydroxymethylpropylene.

$C_4$–$C_{22}$cyloxyalkylene $G_{15}$ is typically 2-ethyl-2-acetoxymethylpropylene.

The following compounds are illustrative examples of polyalkylpiperidine compounds of this class:

50) 9-aza-8,8,10,10-tetramethyl-1,5-dioxaspiro[5.5]undecane
51) 9-aza-8,8,10,10-tetramethyl-3-ethyl-1,5-dioxaspiro[5.5]undecane
52) 8-aza-2,7,7,8,9,9-hexamethyl-1,4-dioxaspiro[4.5]decane
53) 9-aza-3-hydroxymethyl-3-ethyl-8,8,9,10,10-pentamethyl-1,5-dioxaspiro[5.5]undecane
54) 9-aza-3-ethyl-3-acetoxymethyl-9-acetyl-8,8,10,10-tetramethyl-1,5-dioxaspiro[5.5]undecane
55) 2,2,6,6-tetramethylpiperidine-4-spiro-2'-(1',3'-dioxane-5'-spiro-5"-(1",3"-dioxane-2"-spiro-4"'-(2"',2"',6"',6"'-tetramethylpiperidine);

(d') compounds of formulae Id, Ie and If, the compounds of formula If being preferred,

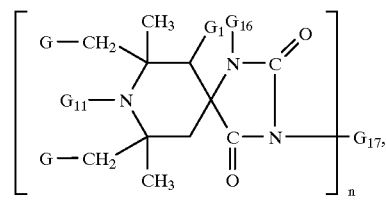

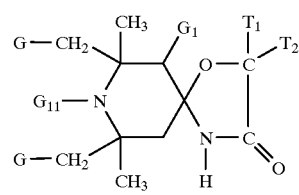

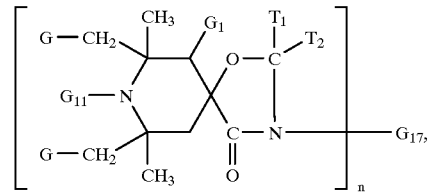

wherein n is 1 or 2, G, $G_1$ and $G_{11}$ have the meaning cited for (a'), $G_{16}$ is hydrogen, $C_{21}$–$C_{12}$alkyl, allyl, benzyl, glycidyl or $C_2$–$C_6$alkoxyalkyl, and, if n=1, $G_{17}$ is hydrogen, $C_1$–$C_{12}$alkyl, $C_3$–$C_5$alkenyl, C7–$C_9$-aralkyl, $C_5$–$C_7$cycloalkyl, $C_2$–$C_4$hydroxyalkyl, $C_2$–$C_6$alkoxyalkyl, $C_6$–$C_{10}$aryl, glycidyl or a group of formula —($CH_2$)p—COO—Q or of formula —($CH_2$)p—O—CO—Q, wherein p=1 or 2, and Q is $C_1$–$C_4$alkyl or phenyl, and, if n=2, $G_{17}$ is $C_2$–$C_{12}$alkylene, $C_4$–$C_{12}$alkenylene, $C_6$–$C_{12}$arylene, a group —CH$_2$—CH(OH)—CH$_2$-O-D-O-CH$_2$—CH(OH)—CH$_2$—, wherein D is $C_2$–$C_{10}$alkylene, $C_6$–$C_{15}$arylene, $C_6$–$C_{12}$cycloalkylene, or a group —CH$_2$CH(OZ')CH$_2$—(OCH$_2$—CH(OZ')CH$_2$)$_2$—, wherein Z' is hydrogen, $C_1$–$C_{18}$alkyl, allyl, benzyl, $C_2$–$C_{12}$alkanoyl or benzoyl, $T_1$ and $T_2$ are each independently of the other hydrogen, $C_1$–$C_{18}$alkyl, or $C_6$–$C_{10}$aryl or $C_7$–$C_9$—aralkyl which are unsubstituted or substituted by halogen or $C_1$–$C_4$alkyl, or $T_1$ and $T_2$, together with the linking carbon atom, form a $C_5$–$C_{14}$cycloalkane ring.

Any substituents defined as $C_1$–$C_{12}$alkyl are typically methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any substituents defined as $C_1$–$C_{18}$alkyl can be, for example, the groups cited above and additionally also e.g. n-tridecyl, n-tetradecyl, n-hexadecyl or n-octadecyl.

Any substituents defined as $C_2$-C6alkoxyalkyl are typically methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$G_{17}$ defined as $C_3$–$C_5$alkenyl is typically 1-propenyl, allyl, methallyl, 2-butenyl or 2-pentenyl.

$C_7$–$C_9$ Aralkyl $G_{17}$, $T_1$ and $T_2$ are preferably phenethyl or, most preferably, benzyl. Where $T_1$ and $T_2$, together with the carbon atom, form a cycloalkane ring, said ring may be e.g. a cyclopentane, cyclohexane, cyclooctane or cyclododecane ring.

$G_{17}$ defined as $C_2$–$C_4$hydroxyalkyl is typically 2-hydroxyethyl, 2-hydroxypropyl, 2-hydroxybutyl or 4-hydroxybutyl.

$C_6$–$C_{10}$Aryl $G_{17}$, $T_1$ and $T_2$ are preferably phenyl, α- or β-naphthyl which are unsubstituted or substituted by halogen or $C_1$–$C_4$alkyl.

$G_{17}$ defined as $C_2$–$C_{12}$alkylene is typically ethylene, propylene, 2,2-dimethylpropylene, tetramethylene, hexamethylene, octamethylene, decamethylene or dodecamethylene.

$C_4$–$C_{12}$Alkenylene $G_{17}$ is preferably 2-butenylene, 2-pentenylene or 3-hexenylene.

$G_{17}$ defined as $C_6$–$C_{12}$arylene is typically o-, m- or p-phenylene, 1,4-naphthylene or 4,4'-diphenylene.

Z' defined as $C_2$–$C_{12}$alkanoyl is typically propionyl, butyryl, octanoyl, dodecanoyl and, preferably, acetyl.

D defined as $C_2$–$C_{10}$alkylene, $C_6$–$C_{15}$arylene or $C_6$–$C_{12}$cycloalkylene has the meaning cited for (b').

The following compounds are illustrative examples of polyalkylpiperidine compounds of this class:

56) 3-benzyl-1,3,8-triaza-7,7,9,9-tetramethylspiro[4.5]decane-2,4-dione
57) 3-n-octyl-1,3,8-triaza-7,7,9,9-tetramethylspiro[4.5]decane-2,4-dione
58) 3-allyl-1,3,8-triaza-1,7,7,9,9-pentamethylspiro[4.5]decane-2,4-dione
59) 3-glycidyl-1,3,8-triaza-7,7,8,9,9-pentamethylspiro[4.5]decane-2,4-dione
60) 1,3,7,7,8,9,9-heptamethyl-1,3,8-triazaspiro[4.5]decane-2,4-dione
61) 2-isopropyl-7,7,9,9-tetramethyl-1-oxa-3,8-diaza-4-oxospiro-[4.5]decane
62) 2,2-dibutyl-7,7,9,9-tetramethyl-1-oxa-3,8-diaza-4-oxospiro-[4.5]decane
63) 2,2,4,4-tetramethyl-7-oxa-3,20-diaza-21-oxodispiro[5.1.11.2]heneicosane
64) 2-butyl-7,7,9,9-tetramethyl-1-oxa-4,8-diaza-3-oxospiro-[4.5]decane and, preferably:
65) 8-acetyl-3-dodecyl-1,3,8-triaza-7,7,9,9-tetramethylspiro[4.5]-decane-2,4-dione, or the compounds of the following formulae:

66) 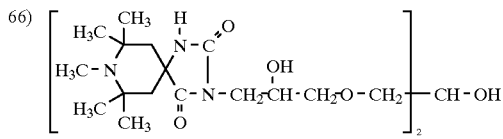

67) 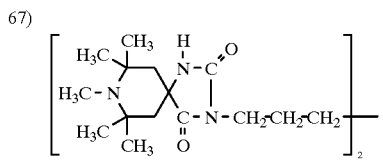

68) 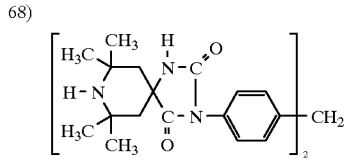

69) 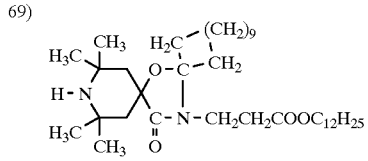

(e') compounds of formula Ig, which are in turn preferred

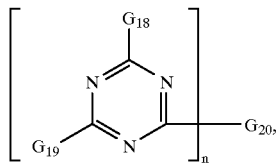
(Ig)

wherein n is 1 or 2, and $G_{18}$ is a group of formula

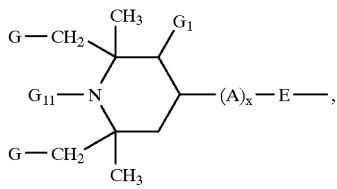

wherein G and $G_{11}$ have the meaning cited for (a'),
$G_1$ and $G_2$ are hydrogen, methyl or, taken together, a substituent=O,
E is —O— or —NG$_{13}$—,
A is $C_2$–$C_6$alkylene or —(CH$_2$)$_3$—O—,
x is 0 or 1,
$G_{13}$ is hydrogen, $C_1$–$C_{12}$alkyl, $C_2$–$C_5$hydroxyalkyl or $C_5$–$C_7$cycloalkyl,
$G_{19}$ is $G_{18}$ or one of the groups —NG$_{21}$G$_{22}$, —OG$_{23}$, —NHCH$_2$OG$_{23}$ or —N(CH$_2$OG$_{23}$)$_2$,
$G_{20}$, if n=1, is $G_{18}$ or $G_{19}$, and, if n=2, $G_{20}$ is a group -E-B-E-, wherein B is $C_2$–$C_8$alkylene, or $C_2$–$C_8$alkylene which is interrupted by 1 or 2 groups —N(G$_{21}$)—, $G_{21}$ is $C_1$–$C_{12}$alkyl, cyclohexyl, benzyl or $C_1$–$C_4$hydroxyalkyl, or a group of formula

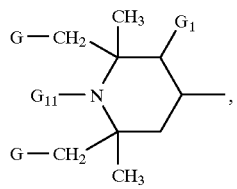

or a group of formula

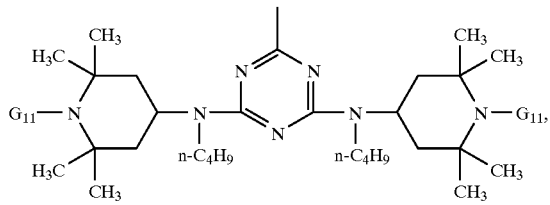

$G_{22}$ is $C_1$–$C_{12}$alkyl, cyclohexyl, benzyl or $C_1$–$C_4$hydroxyalkyl, or $G_2$, and $G_{22}$, taken together, are $C_4$–$C_5$alkylene or $C_4$–$C_5$oxaalkylene, such as —$CH_2CH_2OCH_2CH_2$— or a group of formula —$CH_2CH_2N(G_{11})CH_2CH_2$—, and $G_{23}$ is hydrogen, $C_1$–$C_{12}$ alkyl or phenyl.

Any substituents defined as $C_1$–$C_{12}$alkyl are typically methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any substituents defined as $C_2$–$C_5$hydroxyalkyl are typically 2-hydroxyethyl, 2-hydroxypropyl, 3-hydroxypropyl, 2-hydroxybutyl or 4-hydroxybutyl.

A defined as $C_2$–$C_6$alkylene is typically ethylene, propylene, 2,2-dimethylpropylene, tetramethylene or hexamethylene.

Where $G_{21}$ and $G_{22}$ together are $C_4$–$C_5$alkylene or oxaalkylene, they are, for example, tetramethylene, pentamethylene or 3-oxapentamethylene.

Illustrative examples of polyalkylpiperidine compounds of this class are the compounds of the following formulae:

70)

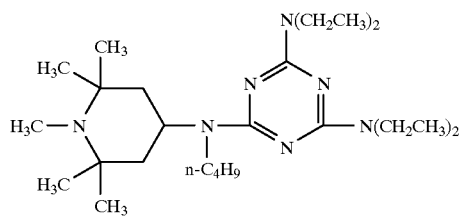

71)

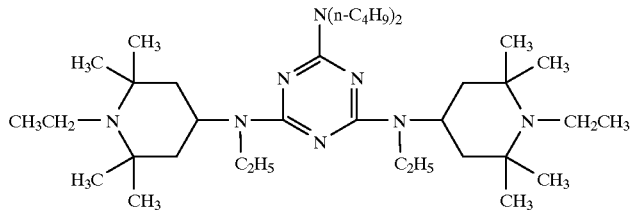

72)

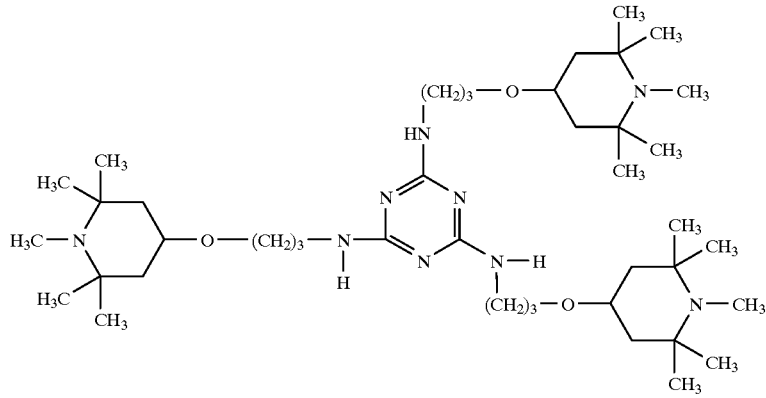

73) 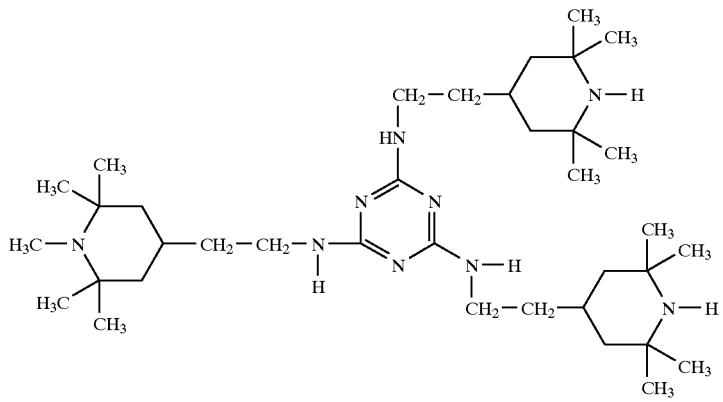
74) 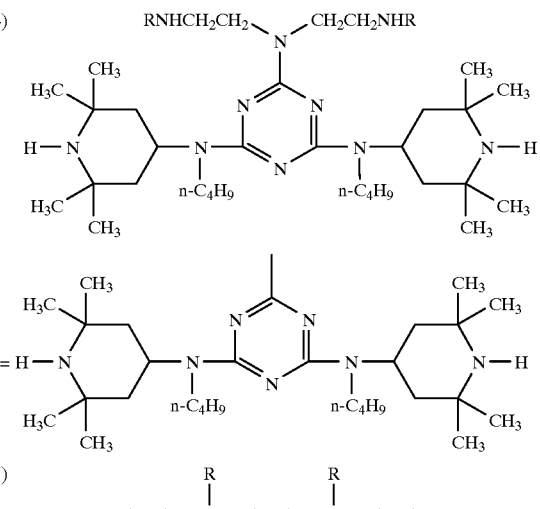
75) 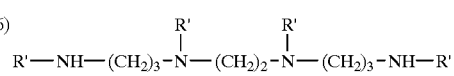
R has the same meaning as in compound 74.
76) 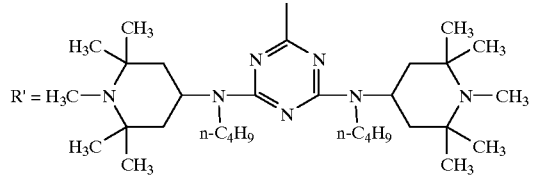
77) 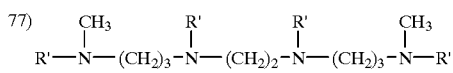
R' has the same meaning as in compound 76.
78) 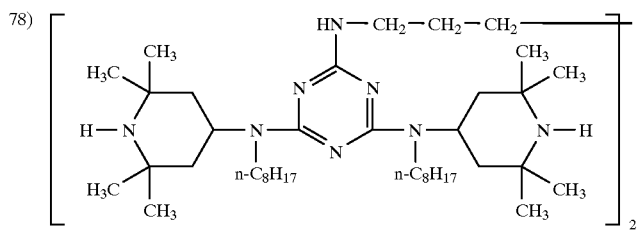

79) 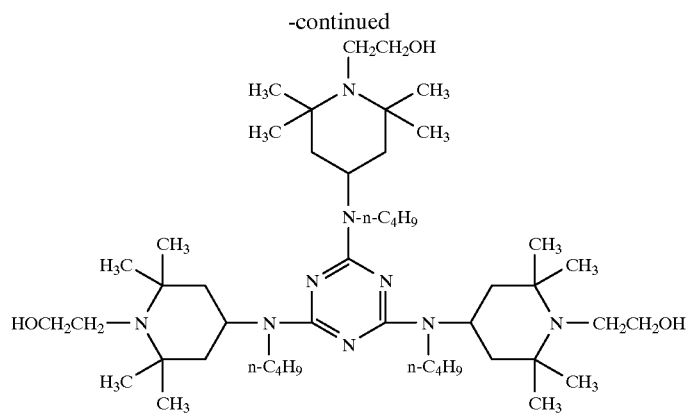

80) 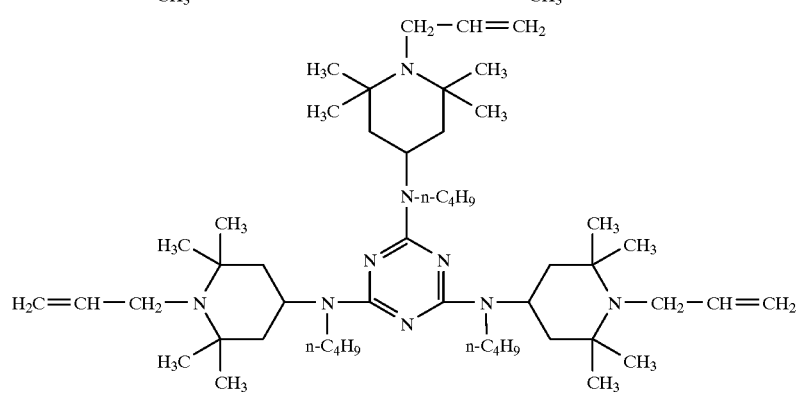

(f') oligomeric or polymeric compounds, the structural repeating units of which contain a 2,2,6,6-tetraalkylpiperidine radical as well as a triazine radical, preferably polyesters, polyethers, polyamides, polyamines, polyurethanes, polyureas, polyaminotriazines, poly(meth)acrylates, poly(meth)acrylamides and the copolymers thereof which contain such radicals.

Illustrative examples of 2,2,6,6-polyalkylpiperidine compunds of this class are compounds of the following formulae, wherein m is a number from 2 to about 200.

84) 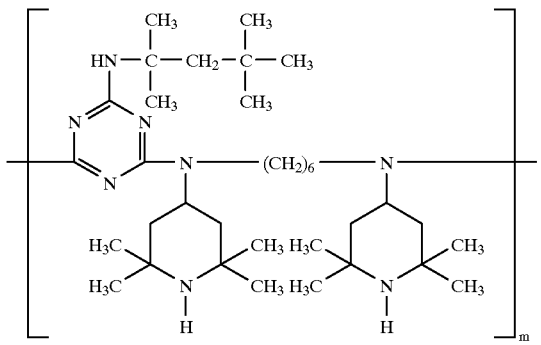

87) 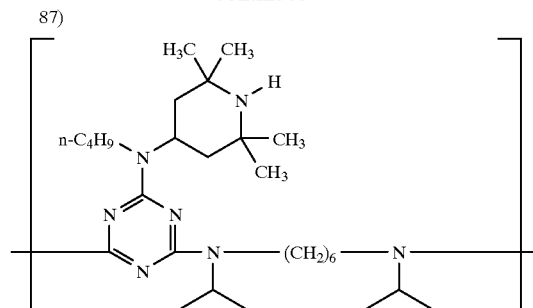

92) 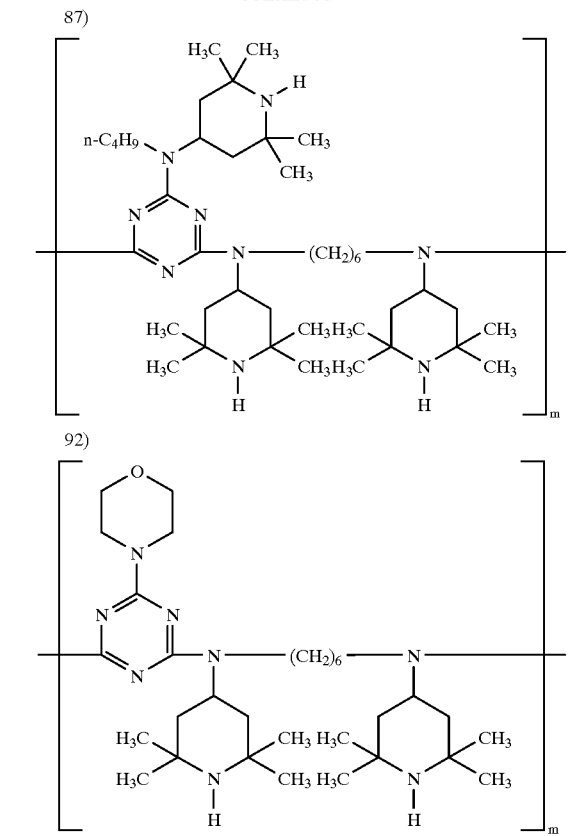

-continued

95)

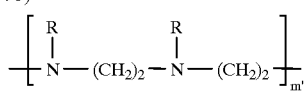

wherein R is a radical of formula

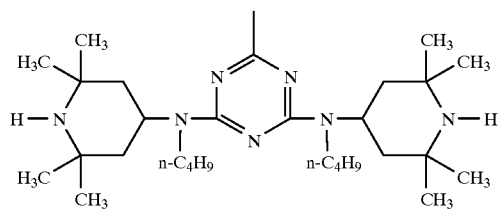

branching of the chain

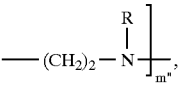

m' and m" are each an integer in the range from 0 to 200, with the proviso that m'+m"=m.

It has also been found that a combination of one of the above-mentioned sterically hindered amines with a polymeric sterically hindered amine which does not contain any triazine units, is also effective as ozone stabiliser. Accordingly, this application also relates to a process for stabilising an organic polymer against ozone in the ambient air, which comprises adding as stabiliser to the polymer a mixture comprising A) a monomeric sterically hindered piperidine compound and/or an oligomeric or polymeric sterically hindered piperidine compound which contains one or several triazine units, and/or a secondary sterically hindered amine, and B) an oligomeric or polymeric sterically hindered piperidine compound which does not contain any triazine unit.

The following compounds are typical examples of the above component B:

81)

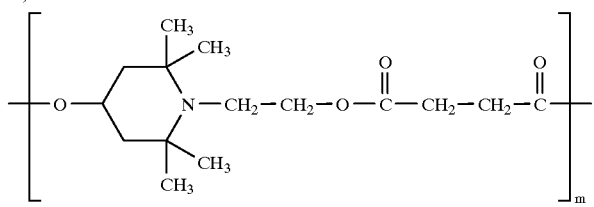

82)

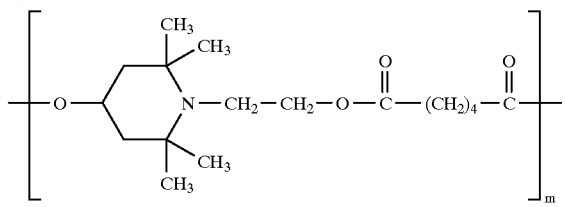

83)

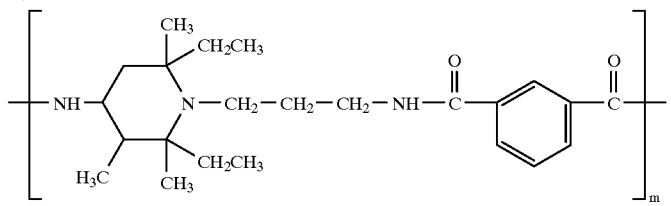

85)

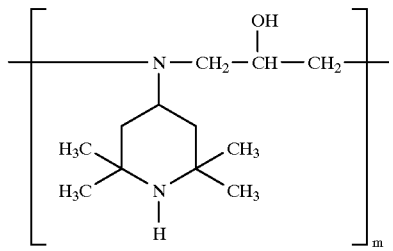

86)
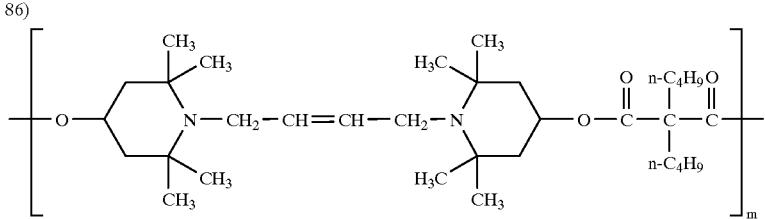
88)
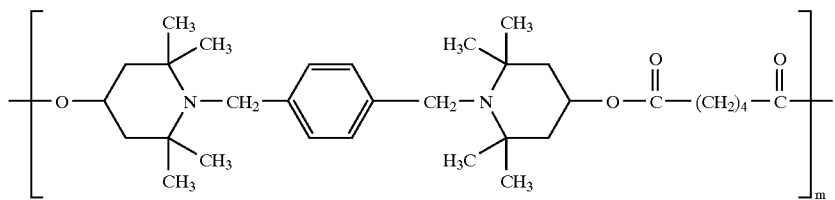
89)
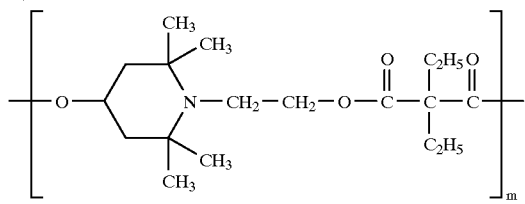
90)
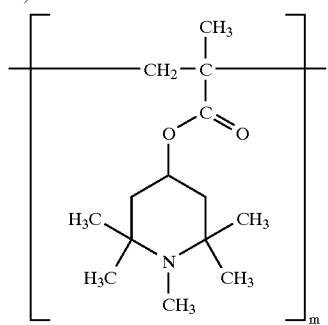
91)
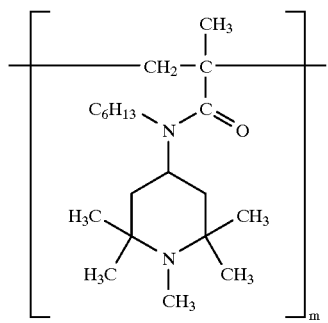
93)
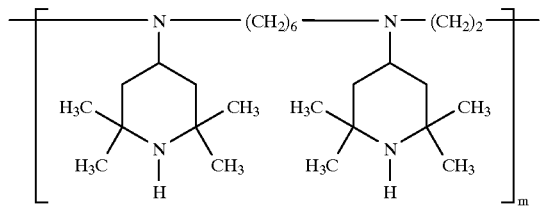

94)

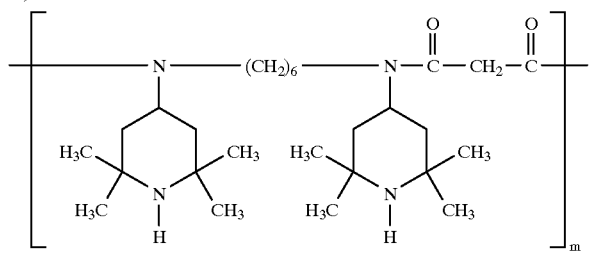

Other examples of polymeric compounds not containing any triazine units are reaction products of compounds of formula

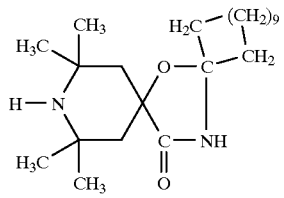

with epichlorhydrin; polyester consisting of butane-1,2,3,4-tetracarbonic acid with a bifunctional alcohol of formula

whose carboxyl side-chains, which originate from the tetracarboxylic acid, are esterified with 2,2,6,6-tetramethyl-4-hydroxypiperidine; compounds of formula

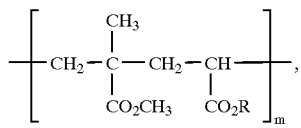

wherein about one third of the radicals R have the meaning —$C_2H_5$, the others being

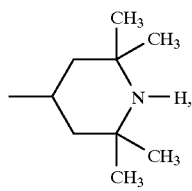

and m is a number in the range from 2 to 200; or copolymers, the structural reapeating units of which are cmposed of two units $$\underset{\mathrm{CH_3}}{\overset{\mathrm{CH_3}}{\mathrm{C}}}=\mathrm{CH_2}$$ (phenyl)

and one unit (maleimide with $C_{13}H_{27}$)

and one unit (maleimide with tetramethylpiperidinyl)

each.

In the novel process, it is preferred to use the tetramethylpiperidines of type (a'), (b') and, preferably, of type (e') and (f') of the above list and, in particular, those whose active compound contains, in addition to the radical of formula I, at least one triazine unit. Secondary sterically hindered amines are particularly preferred.

Particularly interesting compounds are those of formula Ia, wherein n=2, and $G^{12}$ is a radical of an aliphatic dicarboxylic acid having 2 to 12 carbon atoms, which radical may be substituted by —$COOZ^{12}$, $Z^{12}$ being $C_1$–$C_{20}$alkyl; and compounds of formula Ie, wherein n=1 or 2, $G^{18}$ and $G^{19}$ are a group of formula 11, E is —O— or —$NG^{13}$—, A is $C_2$–$C_6$alkylene, and x is either 0 or 1, $G^{13}$ is hydrogen, $C_1$–$C_{12}$alkyl or cyclohexyl, $G^{20}$, if n=1, is $G^{18}$, and, if n=2, is a group -E-B-E-, wherein B is $C_2$–$C_8$alkylene or $C_2$–$C_8$alkylene which is interrupted by 1 or 2 groups —$N(G^{21})$—, $G^{21}$ is $C_1$–$C_{12}$alkyl, cyclohexyl, benzyl or $C_2$–$C_4$hydroxyalkyl or a group of formula I, or G²¹ is a group of formula

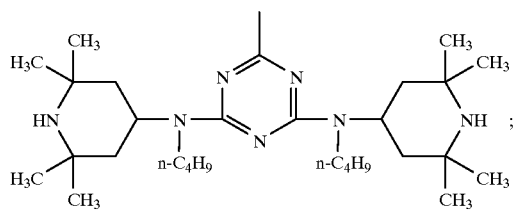

and also oligomeric compounds having 2 to 10 structural repeating units, preferably oligoamines which, in addition to the radicals of formula I, also contain triazine radicals. Such oligoamines are often composed of polyamine units such as hexamethylenetetramine or polymethylenetetramine which are joined via divalent units of formula

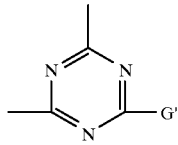

wherein G' is e.g. $C_4$–$C_8$alkylamino, cyclohexylamino, morpholino or N-(2,2,6,6-tetramethyl-piperidin-4-yl)-N-alkylamino, and whose possibly still free NH groups are often substituted in the chain by radicals of the 2,2,6,6-tetramethylpiperidin-4-yl type (formula I).

Compounds of particular technical interest are, for example, those of the following formulae (m denotes a number in the range from 2 to 10):

(compound No. 84; CAS-No. 70624-18-9);

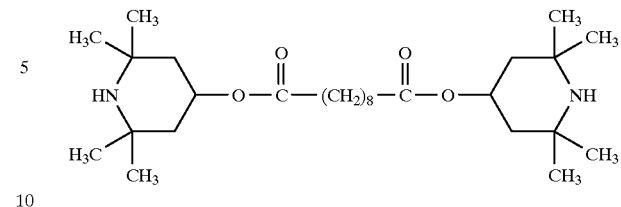

(compound No. 13)

and also the mixture consisting of 1 part by weight of compound A

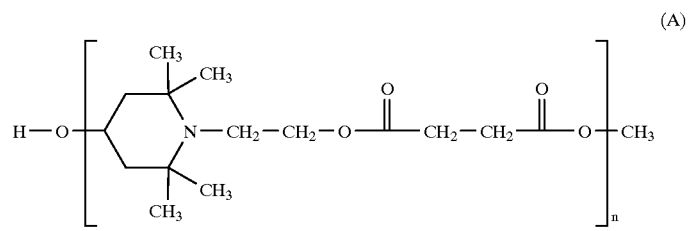

(CAS-No. 65447-77-0);
and 1 part by weight of the above compound No. 84.

In addition, the ozone stabilisers used in the novel process are effective as stabilisers in organic polymers against the harmful effects of light, atmospheric oxygen and heat.

According to this invention, the secondary hindered amines are used in an amount of 0.02 to 5 %, based on the weight of the polymer to be stabilised. The preferred concentrations are in the range from 0.05 to 2 %, most preferably from 0.05 to 1 %, based on the weight of the polymer to be stabilised.

Sterically hindered amines which are particularly preferably added in the novel process are those having a molecular weight, or average molecular weight, in the range from 300 to 10 000, preferably from 1 500 to 10 000, typically from 2 000 to 7 500.

The cited sterically hindered amines are known compounds, many of which are commercially available.

The organic polymers stabilised in accordance with this invention often contain additional conventional additives, such as antioxidants, light stabilisers, metal deactivators, processing stabilisers, nucleating agents, fillers, plasticifiers,

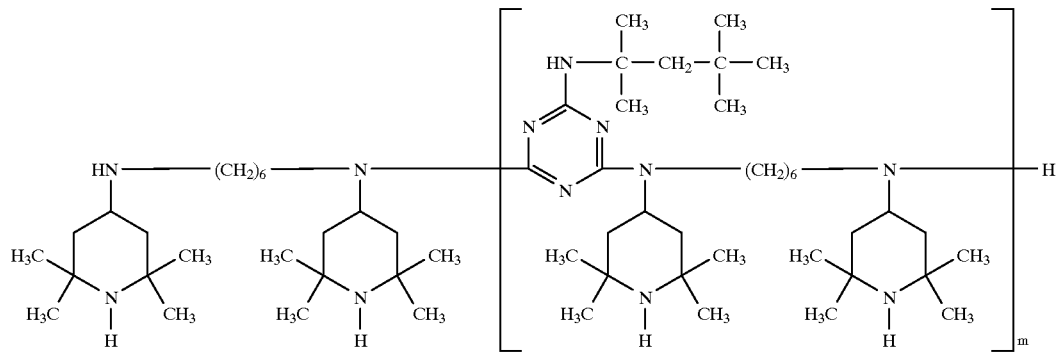

lubricants, emulsifiers, pigments, rheological additives, catalysts, flow control agents, fluorescent whitening agents, flame retardants, antistatic agents or blowing agents. Typical examples are the following additives:

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethyl-phenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-di-methyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroguinones and alkylated hydroguinones, for example 2,6-di-tert-butyl-4-methoxyphenol, 2,5-di-tert-butylhydroquinone, 2,5-di-tert-amylhydroquinone, 2,6-diphenyl-4-octade-cycloxphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxvlated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1 -bis(5-tert-butryl-4-hydroxy-2-methylphenyl)butane, 2,6-bis (3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4-'-hydroxyphenyl)butyrate], bis (3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O—, N— and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, didodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzvl compounds, for example 1,3,5-tris-(3,5-di-tert-butyl-4-hydroxy-benzyl)-2,46-trimethylbenzene, 1,4-bis(3,5-di-tert-butyl-4-hydroxybenzyl)-2,3,5,6-tetrame-thylbenzene, 2,4,6-tris(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxgyhenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)ox-amide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)ox-amide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)trimethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)-hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclo-hexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxy-diphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl) phenyl]amine, tert-octylated N-phenyl-1-naphthylamine, a mixture of mono- and dialkylated tert-butyl/tert-octyidiphenylamines, a mixture of mono- and dialkylated nonyidiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotrizole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, 2-3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methyloxycarbonylethyl)phenyl)-5-chlorobenzotriazole, 2-(3'-tert-butyl-2'-hydroxy-5'-(2-methoxycarbonylethyl)benzotriazole, 2-(3'-tert-butyl-2'-hydroxy-5'-(2-octyloxy-carbonylethyl)phenyl)benzotriale, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylene-bis-[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—C H$_2$CH—COO—CH$_2$CH$_2$─]$_2$ where R=3'-tert-butyl-4'-hydroxy-5'-2H-benzotriazol-2-ylphenyl, 2-[2'-hydroxy-3'-(α,α-dimethylbenzyl)-5-'-1,1,3,3,-tetramethylbutyl)-phenyl]benzotriazole; 2-[2'-hydroxy-3'-(1,1,3,3-tetramethylbutyl)(α,α-dimethylbenzyl)-phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis (4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl a-cyano-,-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4- piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis-(2,2,6,6-tetramethyl-4-piperidyl)-1,2,3,4-butane-tetracarboxylate, 1,1'-(1,2-ethanediyl)-bis-(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro [4.5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6,-pentamethylpperidyl)-1,3,5-triazine and 1,2-bis-(3-aminoproplamino)ethane, 8-acetyl-3-dodecyl-7,7,9,9-tetramethyl-1,3,8-traizaspiro [4.5]decane-2,4-dione, 3-dodecyl-1-(2,2,6,6-tetramethyl-4-piperidyl) pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimid, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro [4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefine-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxphenyl)-4,6-bis(4-methylphenyl)-1,3,5-traizine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl ]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl ]-4,6-bis(2,4,dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-trls [2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy ]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosiphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo [triethyltris(3,3',5,5'-tetra-tert-butyl-1,1'-biphenyl-2,2'-diyl) phosphite], 2-ethylhexy (3,3',5,5'-tetra-tert-butyl-1,1'-biphenyl-2,2'-diyl) phosphite.

Especially preferred are the following phosphites:

Tris(2,4-di-tert-butylphenyl) phosphite (Irgafoso168, Ciba-Geigy), tris(nonylphenyl) phosphite,

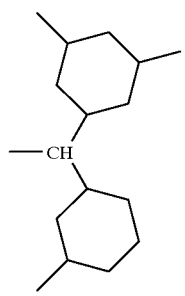
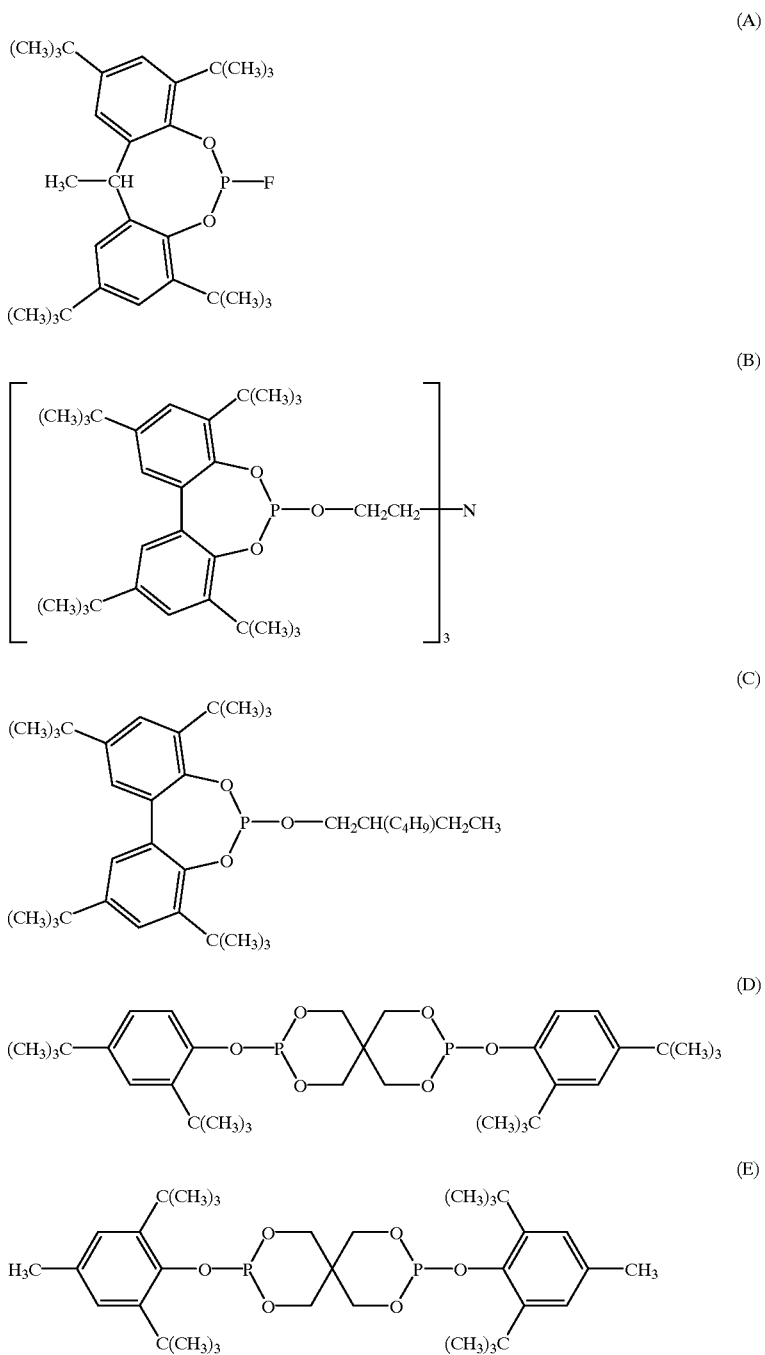

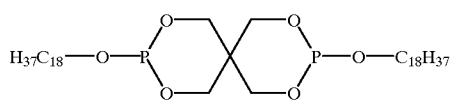

(F)

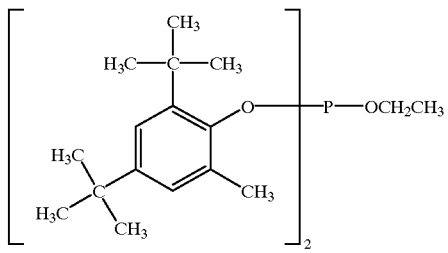

(G)

5. Hydroxylamines, for exmaple N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N, N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. 5,252,643; DE-A-4316611;

DE-A-4316622; DE-A-4316876; EP-A-0589839 or EP-A-0591102 or 3-[4-(2-acetoxyethoxy)-phenyl]-5,7-di-tert-butyl-benzofuran-2-one, 5,7-di-tert-butyl-3-[4-(2-dtearoyloxyethoxy)phenyl]benzofuran-2-one, 3,3'-bis[5,7-di-tert-butyl-3-(4-[2-hydroxyethoxy ]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

The conventional additives of the above list are normally used in concentrations ranging from 0.01 to 5% by weight, based on the organic polymer.

Polymers which can be stabilised against the harmful action of ozone according to this invention are, for example, the following:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIl of the Periodic Table. These metals usually have one or more than one ligand, typically oxides, halides, alcoholates, esters, ethers, amines, alkyls, alkenyls and/or aryls that may be either π- or σ-coordinated.

These metal complexes may be in the free form or fixed on substrates, typically on activated magnesium chloride, titanium(lll) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/ propylene copolymers, linear low density polyethylene (LLDPE) and mixtures thereof with low density polyethylene (LDPE), propylene/but-i-ene copolymers, propylene/ isobutylene copolymers, ethylene/but-i -ene copolymers, ethylene/hexene copolymers, ethylene/methylpentene copolymers, ethylene/heptene copolymers, ethylene/octene copolymers, propylene/butadiene copolymers, isobutylene/ isoprene copolymers, ethylene/alkyl acrylate copolymers, ethylene/alkyl methacrylate copolymers, ethylenetvinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ ethylene-acrylic acid copolymers (EM), LLDPE/EVA, LLDPE/EAA and alternating or random polyalkylene/ carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or a-methylstyrene with dienes or acrylic derivatives, for example styrene/butadiene, styrene/acrylonitrile, styrene/alkyl methacrylate, styrene/ butadiene/alkyl acrylate, styrene/butadiene/alkyl methacrylate, styrene/maleic anhydride, styrene/ acrylonitrile/methyl acrylate; mixtures of high impact strength of styrene copolymers and another polymer, for example a polyacrylate, a diene polymer or an ethylene/ propylene/diene terpolymer; and block copolymers of styrene such as styrene/butadiene/styrene, styrene/isoprene/ styrene, styrene/ethylene/butylene/styrene or styrene/ ethylenelpropylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and acrylonitrile styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/-vinyl acetate or vinylidene chloridehinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate. 10. Copolymers of the monomers mentioned under 9) with each other or with other unsaturated monomers, for example acrylonitrile/ butadiene copolymers, acrylonitrile/alkyl acrylate copolymers, acrylonitrile/alkoxyalkyl acrylate or acrylonitrile/vinyl halide copolymers or acrylonitrile/ alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Polyolefins or polyolefin copolymers, e.g. those of paragraphs 1 to 3 of the above list, can be particularly advantageously protected against the action of ozone; particularly important are polymers of mono- or diolefins, such as those listed in paragraph 1. Good results are obtained especially with polyethylene and polypropylene. Elastomers, in particular filled elastomers such as rubber, inter alia for the production of tires, can also be protected in this manner against the harmful action of ozone.

The incorporation into the organic polymers, e.g. into the synthetic organic, preferably thermoplastic, polymers, can be effected by the addition of the novel mixtures and further optional additives by methods customary in the art. The incorporation can conveniently be carried out before or during moulding, typically by mixing the powdered components or by adding the stabiliser to the melt or the solution of the polymer, or by applying the dissolved or dispersed compounds to the polymer, if required subsequently removing the solvent by evaporation. Elastomers can also be stabilised as latices. Another possibility for incorporating the novel mixtures in polymers consists in adding them to the corresponding monomers before or during the polymerisation thereof or before crosslinking.

The novel mixtures can also be added to the plastic materials to be stabilised in the form of a masterbatch containing these compounds e.g. in a concentration from 2.5 to 25% by weight.

The incorporation of the novel stabilisers may conveniently be effected by the following methods:

as emulsion or dispersion (e.g. to latices or emulsion polymers)

as dry mixture during the blending of additive components or polymer mixtures by direct addition to the processing apparatus (e.g. extruder, internal mixer, etc.)

as solution or melt.

The stabilised polymer compositions so obtained can also be converted into moulded articles by the customary methods, such as hot-press moulding, spinning, extruding or injection moulding, e.g. to fibres, films, tapes, sheets, multiwall sheets, containers, tubes and other profiles.

The polymers stabilised in this manner are distinguished by high fastness to weathering, especially at an elevated ozone concentration in the ambient air. Consequently they retain their mechanical properties as well as their colour and lustre also when being used outdoors.

The following Examples illustrate the invention in more detail. Throughout the Examples, parts or percentages are based on the weight of the polymer to be stabilised, unless otherwise stated.

The following abbreviations are used:

| | |
|---|---|
| PP | polypropylene |
| d | days |

Stabilisers of the following formulae are used in the Examples:

stabiliser A (control):

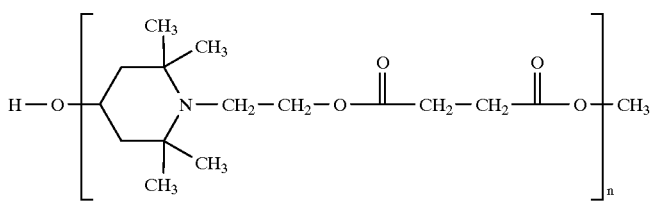

(CAS-No. 65447-77-0);

compound No. 84: Oligomer having structural repeating units of formula (CAS-No. 70624-18-9)

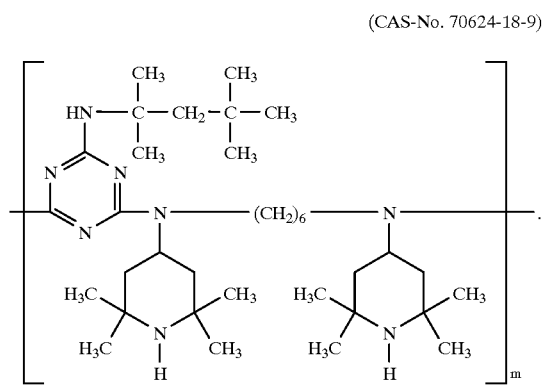

EXAMPLE 1

Long-term heat stability of polypropylene tapes 100 parts by weight of polypropylene powder having a melt index of 2.4 g/10 min (230° C., 2160 g) are mixed in a drum mixer with 0.05 part by weight of pentaerythritol-tetrakis-3-(3,5-di-tert-butyl-4-hydroxyphenyl)propionate, 0.05 part by weight of tris(2,4-di-tert-butylphenyl)-phosphite, 0.1 part by weight of calcium stearate and with the light stabiliser of the following Table 1. This mixture is then granulated in an extruder at a temperature from 180 to 220° C. A control sample does not contain any additional light stabiliser.

The granulate so obtained is processed to a film in a second extruder which is equipped with a sheeting die (220–260° C). This film is cut into tapes which are then stretched at elevated temperature at a ratio of 1:6 and reeled up (titer of the ribbons: 700 to 900 den; tear strength: 5.5 to 6.5 den).

The polypropylene ribbons are cut into samples, each 17 cm long, which are suspended strain-free in a circulating air oven which is then heated to 1 20° C. The measure for the thermo-oxidative resistance of the tapes is the service life of the samples, i.e. the time it takes the samples to drop down from their own weight (time to degradation, oven aging value). The average value of 5 samples is used for assessment. The average ozone content of the air during the test time is determined from data made available by the Lufthygieneamt beider Basel (Agency for the Control of Air Pollution of the Cantons of Basle City and Basle Country) in Liestal, Switzerland.

The results are summarised in the following Table 1.

TABLE 1

Days to the degradation of PP tapes at 120° C.
(in brackets: average ozone content in the air during the test time in $\mu g/m^3$)

| | | Stabilisation: | | |
|---|---|---|---|---|
| start of test | only BS* | BS* + 0.1% of stabiliser A | BS* + 0.2% of stabiliser A | BS* + 0.05% of cmpd No. 84 |
| 15.10.93 | 59d (14.80) | 91d (21.05) | 158d (22.17) | 206d (25.74) |
| 25.11.93 | 49d (28.11) | 78d (24.59) | 142d (27.49) | 204d (30.82) |
| 10.01.94 | 43d (18.62) | 74d (23.80) | 118d (29.06) | 195d (38.02) |
| 24.02.94 | 32d (34.02) | 55d (34.40) | 100d (36.37) | 183d (46.66) |
| 15.04.94 | 25d (35.85) | 37d (34.52) | 74d (40.54) | 181d (41.74) |
| 30.05.94 | 25d (46.36) | 37d (52.59) | 71d (60.43) | 202d (31.84) |
| 15.07.94 | 20d (73.16) | 31d (63.52) | 74d (48.27) | 198d (67.76) |
| 01.09.94 | 39d (19.82) | 73d (14.51) | 138d (13.61) | 199d (18.63) |
| 17.10.94 | 47d (7.42) | 83d (11.21) | 147d (17.67) | 188d (20.31) |
| 30.11.94 | 46d (15.60) | 67d (18.39) | 126d (25.10) | 191d (25.10) |

*BS = basic stabilisation 0.05% by weight of pentaerythritol-tetrakis(3-[3', 5'-di-tert-butyl-4'-hydroxyphenyl]propionate) and 0.05% of tris(2,4-di-tert-butylphenyl)phosphite.

Diagrams 1 to 4 are graphic representations of the data of colums 2-5 of the above Table 1. The respective reciprocal oven aging value is plotted over the average ozone concentration. A linear correlation is apparent in the form of $$1OF = A + B \cdot [ozone],$$

wherein OF is the oven aging value in days, [ozone] is the average ozone content of the air in $\mu g/m^3$ during the test time, and A and B are free parameters.

Diagram 1 shows that 1/OF increases at an increased ozone concentration; those samples without any additional stabiliser degrade faster at a higher ozone content of the ambient air.

Diagrams 2 and 3 show the same correlation in those samples to which a tertiary hindered amine (stabiliser A) was added as additional stabiliser.

Diagram 4 shows that 1/OF remains constant after the addition of a stabiliser of this invention (compound No. 84); the ozone content of the ambient air has no influence of the service life of the samples.

The service life of the samples stabilised according to this invention is independent of the ozone content of the ambient air and can therefore be predicted with high accuracy. The use of unnecessarily high stabiliser dosages can thus be avoided.

What is claimed is:

1. A process for stabilising an organic polymer against ozone in the ambient air, wherein the ozone concentration averaged by the service life of the organic polymer is more than 10 $\mu g/m^3$, which comprises adding to the polymer an effective ozone stabilising amount of a monomeric sterically hindered piperidine compound, or an oligomeric or polymeric sterically hindered piperidine compound containing one or several triazine units, or a secondary sterically hindered piperidine compound, the stabiliser containing a radical of formula I

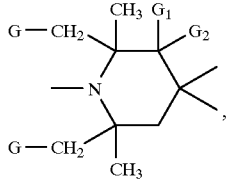
(I)

wherein
G is hydrogen or methyl, and
$G_1$ and $G_2$ are hydrogen, methyl, or taken together, oxygen.

2. A process according to claim 1, which comprises adding to the polymer as stabiliser a compound containing a 2,2,6,6-tetramethylpiperidine unit of formula I'

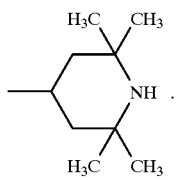
(I')

3. A process according to claim 1, wherein the organic polymer is a polyolefin or polyolefin copolymer.

4. A process according to claim 1, wherein the organic polymer is an elastomer.

5. A process according to claim 1, wherein the compound which is effective as stabiliser contains, in addition to the radical of formula I, a triazine unit.

6. A process according to claim 5, wherein the compound which is effective as stabiliser is selected from
i) compounds of formula Ig

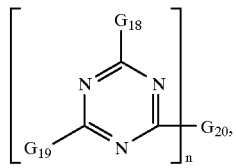
(Ig)

wherein n is 1 or 2, and $G^{18}$ is a group of formula II

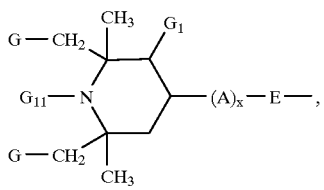
(II)

wherein G and $G_1$ have the meaning defined in claim 1, $G_{11}$, is hydrogen, O', hydroxy, NO, —CH$_2$CN, $C_1$–$C_{18}$alkyl, $C_3$–$C_8$alkenyl, $C_3$–$C_8$alkynyl, $C_7$–$C_{12}$— aralkyl, $C_1$–$C_{18}$alkoxy, $C_5$–$C_8$cycloalkoxy, $C_7$–$C_9$-phenylalkoxy, $C_1$–$C_8$alkanoyl, $C_3$–$C_5$alkenoyl, benzyloxy, glycidyl or a group —CH$_2$CH(OH)—Z,
Z is hydrogen, methyl or phenyl,
E is —O— or —NG$_{13}$—,
A is $C_2$–$C_6$alkylene or —(CH$_2$)$_3$—O—,
x is 0 or 1,
$G_{13}$ is hydrogen, $C_1$–$C_{12}$alkyl, $C_2$–$C_5$hydroxyalkyl or $C_5$–$C_7$cloalkyl,
$G_{19}$ is $G_{18}$ or one of the groups —NG$_{21}$G$_{22}$, —OG$_{23}$, —NHCH$_2$OG$_{23}$ or —N(CH$_2$OG$_{23}$)$_2$,
$G_{20}$, if n=1, is $G_{18}$ or $G_{19}$, and, if n=2, $G_{20}$ is a group —E—B—E—, wherein B is $C_2$–$C_2$aklylene,
or $C_2$–$C_8$alkylene which is interrupted by 1 or 2 groups —N(G$_{21}$)—,
$G_{21}$ is $C_1$–$C_{12}$alkyl, cyclohexyl, benzyl or $C_1$–$C_4$hydroxyalkyl, or a group of formula

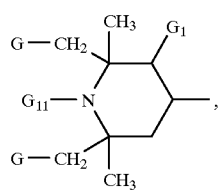

or a group of formula

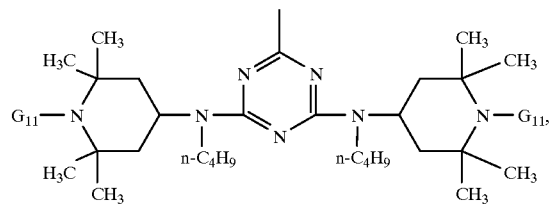

$G_{22}$ is $C_1$–$C_{12}$alkyl, cyclohexyl, benzyl or $C_1$–$C_4$hydroxyalkyl, or $G_{21}$ and $G_{22}$, taken together, are $C_4$–$C_5$alkylene or $C_4$–$C_5$oxaalkylene, such as —CH$_2$CH$_2$OCH$_2$CH$_2$—, or a group of formula —CH$_2$CH$_2$N(G$_{11}$)CH$_2$CH$_2$—, and
$G_{23}$ is hydrogen, $C_1$–$C_{12}$alkyl or phenyl;

ii) oligomeric or polymeric compounds, the structural repeating units of which contain a radical of formula I and triazine.

7. A process according to claim 1, wherein G and $G_1$ are hydrogen and $G_{11}$ is hydrogen, $C_1$–$C_4$alkyl, allyl, benzyl, acetyl or acryloyl.

8. A process according to claim 1, wherein the compound which is effective as stabiliser is added in an amount of 0.02 to 5%, based on the weight of the polymer to be stabilised.

9. A stabilised organic polymer in contact with ozone, wherein the ozone concentration averaged by the service life of the organic polymer is more than 10 μg/m$^3$, which polymer comprises as stabiliser a monomeric sterically hindered piperidine compound or oligomeric or polymeric sterically hindered piperidine compound, containing one or several triazine units, or a secondary sterically hindered piperidine compound, the stabiliser containing a radical of formula I as defined in claim 1.

* * * * *